(12) United States Patent
Pliete et al.

(10) Patent No.: US 9,870,292 B2
(45) Date of Patent: Jan. 16, 2018

(54) CONFIGURATIONLESS REDUNDANCY

(71) Applicant: epro GmbH, Gronau (DE)

(72) Inventors: Christian Pliete, Ochtrup (DE); Ralf Kosse, Gronau (DE)

(73) Assignee: EPRO GMBH, Gronau (DE)

( * ) Notice: Subject to any disclaimer, the term of this patent is extended or adjusted under 35 U.S.C. 154(b) by 44 days.

(21) Appl. No.: 15/072,441

(22) Filed: Mar. 17, 2016

(65) Prior Publication Data

US 2017/0270013 A1 Sep. 21, 2017

(51) Int. Cl.
| | |
|---|---|
| *G06F 11/00* | (2006.01) |
| *G06F 11/16* | (2006.01) |
| *G06F 11/14* | (2006.01) |
| *G06F 11/07* | (2006.01) |

(52) U.S. Cl.
CPC ...... *G06F 11/1658* (2013.01); *G06F 11/0793* (2013.01); *G06F 11/1451* (2013.01); *G06F 11/1456* (2013.01); *G06F 11/1461* (2013.01); *G06F 2201/805* (2013.01)

(58) Field of Classification Search
CPC ............. G06F 11/1451; G06F 11/1456; G06F 11/1461; G06F 11/0793; G06F 11/16; G06F 11/1658
See application file for complete search history.

(56) References Cited

U.S. PATENT DOCUMENTS

| | | | |
|---|---|---|---|
| 6,073,251 A * | 6/2000 | Jewett | ........................ G06F 1/12 714/6.32 |
| 8,548,956 B2 | 10/2013 | Allison et al. | |
| 8,935,216 B2 | 1/2015 | Allison et al. | |
| 2003/0084357 A1* | 5/2003 | Bresniker | ............. G06F 1/3203 713/320 |
| 2003/0105993 A1* | 6/2003 | Colrain | ................. G06F 9/5061 714/39 |
| 2004/0139367 A1* | 7/2004 | Boyd | .................. G06F 11/1474 714/6.3 |
| 2009/0222686 A1* | 9/2009 | Nibarger | .................. B25J 11/00 714/3 |
| 2011/0209131 A1* | 8/2011 | Hohenstein | ............... G06F 8/65 717/168 |
| 2012/0158872 A1* | 6/2012 | McNamee | .............. H04L 69/40 709/206 |
| 2014/0019798 A1 | 1/2014 | Allison et al. | |
| 2015/0205849 A1 | 7/2015 | Jayapal et al. | |
| 2016/0232061 A1* | 8/2016 | Gaschler | ............. G06F 11/1461 |

* cited by examiner

*Primary Examiner* — Charles Ehne
(74) *Attorney, Agent, or Firm* — Luedeka Neely Group, P.C.; Rick Barnes

(57) ABSTRACT

A method for configuring components in a computing system. A selected one of the components is designated as a primary component, the other components thereby automatically adopting a status of secondary component. The designation of the primary component is stored in a first memory that is accessible by at least one of the primary component, at least one secondary component, and the computing system. Upon occurrence of a predetermined computing system event, the first memory is read to determine the designation of the primary component. A configuration file from a second memory is automatically copied to a memory of at least one secondary component, thereby creating a new configuration file in the at least one secondary component.

19 Claims, 1 Drawing Sheet

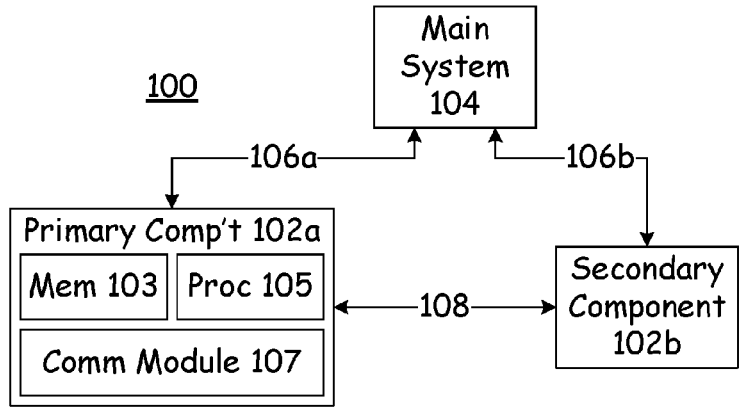

Fig. 1

| Power Sequence | | Primary | | Secondary | |
|---|---|---|---|---|---|
| Primary | Secondary | Before | After | Before | After |
| First | Second | Default | Default | Default | Default |
| | | Default | Default | Config B | Default |
| | | Config A | Config A | Default B | Config A |
| | | Config A | Config A | Config B | Config A |
| Second | First | Default | Default | Default | Default |
| | | Default | Config B | Config B | Config B |
| | | Config A | Default B | Default B | Default B |
| | | Config A | Config B | Config B | Config B |
| Concurrent | Concurrent | Default | Default | Default | Default |
| | | Default | Default | Config B | Default |
| | | Config A | Config A | Default B | Config A |
| | | Config A | Config A | Config B | Config A |

CONFIGURATIONLESS REDUNDANCY

FIELD

This invention relates to the field of replaceable computing components. More particularly, this invention relates to configuring redundant components in a computing system.

INTRODUCTION

Maintaining configurations of computing systems is important for high availability of such systems. It is often an issue to store the right configuration into the right element of a system. It is important for some computing systems to remain fully functional for a high percentage of the time. In some systems this high uptime is accomplished by having one or more layers of redundancy in the various components of the system. For example, if it is important to always have network communication between system A and system B, each of the two systems might have two network communication cards, instead of just one. In this manner, if one of the cards in one or more of the two systems becomes inoperable or unreliable for any reason, the other card can immediately be used by the associated system to continue the network communications.

While this generally works quite well, it takes a significant amount of time and effort (and therefore, cost) to ensure that the secondary component is properly configured, such that if and when the primary component goes down or is otherwise removed from service, the secondary component is immediately ready to continue the associated service to the system.

Similarly, some systems do not have redundant components, and thus when a given component of the computing system fails, the old component must be replaced, and a new component must be inserted. While in many rack mount systems the process of replacing a failed hardware component is relatively easy and quick, configuring the new component to match the configuration of the old component can be quite time-consuming. In some cases, the configuration of the old component is irretrievably lost at the moment that the old component fails or is removed from the computing system.

What is needed, therefore, is a system that reduces issues such as those described above, at least in part.

SUMMARY

The above and other needs are met by a method for configuring components in a computing system. A selected one of the components is designated as a primary component, the other components thereby automatically adopting a status of secondary component. The designation of the primary component is stored in a first memory that is accessible by at least one of the primary component, at least one secondary component, and the computing system. Upon occurrence of a predetermined computing system event, the first memory is read to determine the designation of the primary component. A configuration file from a second memory is automatically copied to a memory of at least one secondary component, thereby creating a new configuration file in the at least one secondary component.

In various embodiments, the step of designating the primary component is accomplished by at least one of: setting a jumper on the primary component; setting a switch on the primary component; setting a value in a location in the memory of the primary component; selecting a designated physical connection of the computing system in which one of the components is inserted; a user of the computing system; selecting which of the components was inserted into the computing system first; selecting which of the components is functioning in a more stable manner; selecting which of the components has a desired configuration; removing all but one of the components and designating the one remaining component as the primary component.

In various embodiments, the predetermined event includes at least one of: powering up the computing system; insertion of an additional component; a command issued by a user of the computing system; a change to the configuration of the primary component.

In various embodiments, copying the configuration includes copying the configuration from the primary component to the at least one secondary component across at least one of a common bus that is used by all of the components to communicate with the computing system, and a dedicated communication link between all of the components. In some embodiments the step of copying the configuration comprises copying the configuration from the primary component to a memory in the computing system and copying the configuration from the memory in the computing system to the at least one secondary component.

According to another aspect of the invention there is described a second component for a computing system, where the second component includes a memory for storing a configuration file, a communication link for communicating with at least one of the computing system and first components in communication with the computing system, and a processor. The processor searches for one of the first components to which the second component is redundant, and when such first component is found, receives into the memory of the second component a configuration file from the first component.

In various embodiments according to this aspect of the invention, the communication link is a common bus that is used by all of the first components to communicate with the computing system. In some embodiments the communication link a dedicated communication link between just the second component and any of the first components to which the second component is redundant.

According to yet another aspect of the invention there is described a method for configuring components in a computing system, by storing a configuration file for a first component in a first memory that is accessible by at least one of the first component and the computing system. The first component is removed from the computing system, and a second component having similar functionality is inserted into the computing system. The configuration file is automatically copied from the first memory to a memory of the second component, thereby creating a new configuration file in the second component.

According to still another aspect of the invention there is described a second component for a computing system, where the second component includes a memory for storing a configuration file, a communication link for communicating with at least one of the computing system and first components in communication with the computing system, and a processor. The processor searches for a first component configuration associated with a previous one of the first components to which the second component is of similar type and task and when such first component configuration is found, receives into the memory of the second component the associated first component configuration.

DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 1 is a functional block diagram of two computing system components according to an embodiment of the present invention.

FIG. 2 is a table of configuration hierarchy for two redundant components according to an embodiment of the present invention.

DESCRIPTION

With reference now to FIG. 1, there is depicted a functional block diagram of a computing system 100 having two components 102. The computing system 100 can take many different forms. For example, it could be a backplane system, with a chassis 104 that accepts card components 102. In other embodiments it could be a personal computer 104 that accepts cards, such as into PCI slots. Many other different embodiments, as well known to those with skill in the art, are contemplated.

The computing system 100 may have components 102 of many different kinds included in the system, such as video cards, memory cards, interface cards, special purpose hardware, processor cards, system cards, storage cards, and so forth. However, the components 102*a* and 102*b* are depicted because they offer redundant services to the computing system 100. In other words, both of the components 102 as depicted offer the same functionality to the computing system 100. In the computing system 100, one of the components 102 is intended to be a primary provider of the given function, and the other of the components 102 is intended to a secondary or backup provider of the given function. In the embodiments as depicted in FIG. 1, component 102*a* is labeled as the primary component, and component 102*b* is labeled as the secondary component.

In some embodiments, the primary component 102*a* will provide all of the services as desired to the computing system 100, while the secondary component 102*b* will remain in the computing system 100, but not be used by the computing system 100 until such time as the primary component 102*a* fails in some way. At that time, it is desired that the secondary component 102*b* will immediately be put into service and the primary component 102*a* will immediately be taken out of service automatically by the computing system 100.

This immediate and automatic switch from the failed primary component 102*a* to the secondary component 102*b* cannot be accomplished unless the secondary component 102*b* is already configured like the primary component 102*a*, prior to the failure of the primary component 102*a*. Thus, various embodiments of the present invention provide for the automatic configuration of the secondary component 102*b* prior to the failure of the primary component 102*a*. In some embodiments, once the failed primary component 102*a* is removed from the computing system 100, the operable secondary component 102*b* then becomes the new primary component 102*a*, and when a new redundant component 102 is inserted into the computing system 100, it is then designated as the new secondary component 102*b*.

As depicted in FIG. 1, the primary component 102*a* includes a memory 103, a processor 105 of some type, and a communication module 107. Although not depicted so as to not unduly burden the presentation, the secondary component 102*b* also includes these modules as depicted. The memory 103 is where the configuration file for the component 102 is stored. The processor 105 handles basic functions of the component 102, and in some embodiments also handles some of the automated configuration of the components 102. The communication module 107 enables the component 102 to communicate not only with the main system 104, such as through some kind of standard bus 106, but in some embodiments allows for proprietary communication between the primary component 102*a* and the secondary component 102*b*, such as through a dedicated communication line 108.

There are several different ways in which one of the components 102 is designated as the primary component 102*a*. For example, a physical modification can be made to the primary component 102*a*, such as setting a jumper position, flipping a switch, cutting a link, and so forth. In another embodiment, the primary component 102*a* is manually selected by a user of the computing system 100. In another embodiment, the primary component 102*a* is designated by setting an electronic setting somewhere on the primary component 102*a*, such as by storing a value in a specific location within the memory 103 or setting the state of some other subcomponent of the primary component 102*a*. In yet another embodiment, the primary component 102*a* is selected based upon which slot in the computing system 100 the component 102 is insert. In some embodiments, the primary component 102*a* is selected based upon which of the components 102 was inserted into the computing system 100 first, or which was powered up first, or which is functioning in the most appropriate manner, or which component 102 is already configured in the desired manner. In some embodiments, the only component 102 remaining in the computing system 100 that has a given functionality—in other words, for which there is no redundant component 102—is designated as the primary component 102*a*.

It is appreciated that there may be many primary components 102*a* in a given computing system 100, such as the primary video card 102*a*, the primary storage card 102*a*, the primary processor card 102*a*, and so forth, each with secondary components 102*b* that provide backup for the various computing system 100 services.

In some embodiments the secondary component 102*b* is programmed with the configuration of the primary component 102*a* prior to any eventual failure of the primary component 102*a*. Thus, in some embodiments there is one or more predetermined event at which the configuration file is copied to the secondary component 102*b*. This can be accomplished in a number of different ways, and at a variety of different times.

For example, in some embodiments the configuration of the primary component 102*a* is copied directly from the memory 103 of the primary component 102*a* to the memory 103 of the secondary component 102*b*. This can be accomplished either across the system bus 106 or across the proprietary communication line 108. In another embodiment the configuration file for the primary component 102*a* is backed up somewhere within the main system 104, and at some point in time is copied via the system bus 106*b* to the memory 103 of the secondary component 102*b*. Thus, the configuration file in some embodiments comes directly from the primary component 102*a*, and in other embodiments comes from the main system 104.

The event at which the configuration file is created in the memory 103 of the secondary component 102*b* can be one or more of the following, in various embodiments. For example, the configuration file can be written as soon as the secondary component 102*b* is inserted into the computing system 100. The configuration file can be written when the secondary component 102b is powered up, or when the computing system 100 is powered up. In another embodiment the configuration file can be created in the memory 103 of the secondary component 102b when the configuration file in the memory 103 of the primary component 102a is changed in some manner.

FIG. 2 depicts a table of several examples of how and when the configuration file is copy and created in one or the other of the two components 102. On the left side of the table there are depicted three options for the power sequencing of the primary component 102a and secondary component 102b, indicating which of the two components 102 is powered on first, or if they are powered on concurrently. On the right side of the table is indicated the configuration for each of the components 102, both before the power sequence and after the power sequence.

The first condition depicted in the table of FIG. 2 is where the primary component 102a is powered on before the secondary component 102b. In this embodiment, the configuration file for the primary component 102a does not change before or after the power up sequence. Thus, whether the configuration of the primary component 102a is default of a specific Configuration A, the configuration file in the memory 103 of the primary component 102a is the same both before and after the power up sequence.

However, the configuration file of the secondary component 102b does change, depending upon the differences in the configuration files of the primary component 102a and the secondary component 102b before the power up sequence. For example, if both components 102 had the default settings prior to the power up sequence, then there is no need to make any change to the configuration file of the secondary component 102b. But in every case, where the configuration file of the secondary component 102b differs from the power up condition of the primary component 102a, the configuration file of the secondary component 102b is either changed or newly created to match exactly the configuration file of the primary component 102a.

In the second set of FIG. 2, there is the example of when the secondary component 102b is powered up prior to the primary component 102a being powered up. This could occur when the original primary component 102a has failed and been removed, or has been removed for some other purpose, and thus is inserted into the computing system 100 after the secondary component 102b is already present in the system. This is an example where the secondary component 102b becomes, in effect, the new primary component 102a. Thus, in this embodiment the configuration file of the secondary component 102b doesn't change during the power up sequence of the primary component 102a, but instead, the configuration file of the primary component 102a is either modified or newly created to be the same as the configuration file of the secondary component 102b that was preexisting in the computing system 100, or in other words, antedated the power up sequence of the newly inserted primary component 102a.

The final example given in the chart of FIG. 2 is when the two components 102 are powered up simultaneously, such as when both components have been newly inserted into a powered down system 100, and then the entire system 100 is brought up at the same time. In this embodiment, the one of the components 102 that has been designated as the primary component 102a, as described in the various embodiments for doing so given above, retains its original configuration file, while the configuration file of the one or more redundant secondary components 102b is either modified or created so as to match the configuration file of the primary component 102a.

In some embodiments the configuration file is written to a redundant secondary component 102b after the primary component 102a fails. In some embodiments, the secondary component 102b is only inserted into the system 100 after the primary component 102a fails. In some embodiments, the configuration file is copied from the primary component 102a or otherwise created in a memory in the system 100 prior to failure of the primary component 102a, and then when the secondary component 102b is inserted into the system 100, the system 100 recognizes that the secondary component 102b provides the functionality of the failed primary component 102a, and automatically copies the configuration to the secondary component 102b prior to putting it into service.

In some embodiments the secondary component 102b is inserted into the system 100 and the configuration is copied into the secondary component 102b after the primary component 102a is removed from the system 100. In other embodiments the secondary component 102b is inserted into the system 100 and the configuration is copied into the secondary component 102b before the primary component 102a is removed from the system 100.

In some embodiments the system 100 directs the copying of the configuration file from the failed primary component 102a to the new secondary component 102b across a common system bus. In other embodiments the system 100 directs the copying of the configuration file directly from the failed primary component 102a to the new secondary component 102b across a dedicated communication link between the primary component 102a and the secondary component 102b.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for configuring redundant components having common functionality in a computing system, the method comprising the steps of:

designating a selected one of the components as a primary component, the other components thereby automatically adopting a status of secondary component, storing the designation of the primary component in a first memory that is accessible by at least one of the primary component, at least one secondary component, and the computing system, storing a configuration of the primary component in a second memory, upon occurrence of a predetermined computing system event, reading the second memory to retrieve the configuration of the primary component, and automatically copying the configuration of the primary component to a memory of at least one secondary component, thereby creating a new configuration file in the at least one secondary component.

2. The method of claim 1, wherein the step of designating the primary component is accomplished by at least one of:
   a. setting a jumper on the primary component,
   b. setting a switch on the primary component,
   c. setting a value in a location in the memory of the primary component,
   d. selecting a designated physical connection of the computing system in which one of the components is inserted,
   e. a user of the computing system,
   f. selecting which of the components was inserted into the computing system first,
   g. selecting which of the components has a desired configuration, and
   h. removing all but one of the components and designating the one remaining component as the primary component.

3. The method of claim 1, wherein the predetermined event comprises powering up the computing system.

4. The method of claim 1, wherein the predetermined event comprises insertion of an additional component.

5. The method of claim 1, wherein the predetermined event comprises a command issued by a user of the computing system.

6. The method of claim 1, wherein the predetermined event comprises a change to the configuration of the primary component.

7. The method of claim 1, wherein the step of copying the configuration comprises copying the configuration from the primary component to the at least one secondary component across a common bus that is used by all of the components to communicate with the computing system.

8. The method of claim 1, wherein the step of copying the configuration comprises copying the configuration from the primary component to the at least one secondary component across a dedicated communication link between all of the components.

9. The method of claim 1, wherein the step of copying the configuration comprises copying the configuration from the primary component to a memory in the computing system and copying the configuration from the memory in the computing system to the at least one secondary component.

10. A second component for a computing system, the second component comprising:
    a memory for storing a configuration file,
    a communication link for communicating with at least one of the computing system and first components in communication with the computing system,
    a processor for searching for one of the first components to which the second component is redundant, and when such first component is found, for receiving into the memory of the second component a configuration file from the first component.

11. The second component of claim 10, wherein the communication link is a common bus that is used by all of the first components to communicate with the computing system.

12. The second component of claim 10, wherein the communication link a dedicated communication link between just the second component and any of the first components to which the second component is redundant.

13. A method for configuring components in a computing system, the method comprising the steps of:
    coping a configuration file from a first component in the computing system to a first memory that is accessible by the first component and the computing system,
    removing the first component from the computing system,
    inserting into the computing system a second component having similar functionality to the first component, and
    the computing system automatically copying the configuration file from the first memory to the second component, thereby creating a new configuration file in the second component.

14. The method of claim 13, wherein the first component is removed from the computing system after inserting the second component into the computing system.

15. The method of claim 13, wherein the steps of copying the configuration file comprises copying the configuration file across a common bus that is used by all of the components to communicate with the computing system.

16. The method of claim 13, wherein the steps of copying the configuration file comprises copying the configuration file across a dedicated communication link between the first component and the second component.

17. A second component for a computing system, the second component comprising:
    a memory for storing a configuration file,
    a communication link for communicating with at least one of the computing system and first components in communication with the computing system,
    a processor for searching for a first configuration file associated with a failed one of the first components to which the second component is of a similar type and task, and when such first configuration file is found, for receiving into the memory of the second component the first configuration file.

18. The second component of claim 17, wherein the communication link is a common bus that is used by all of the first components to communicate with the computing system.

19. The second component of claim 17, wherein the communication link a dedicated communication link between just the second component and any of the first components to which the second component is redundant.

* * * * *